(12) United States Patent
Wagner

(10) Patent No.: US 6,371,094 B1
(45) Date of Patent: Apr. 16, 2002

(54) METHOD AND APPARATUS FOR FORMING A FUEL-AIR MIXTURE FOR AN INTERNAL COMBUSTION ENGINE DURING A WARMUP PHASE

(75) Inventor: Wolfgang Wagner, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/672,093

(22) Filed: Sep. 29, 2000

(30) Foreign Application Priority Data

Sep. 29, 1999 (DE) .......................... 199 46 606

(51) Int. Cl.⁷ .................................. F02B 1/00
(52) U.S. Cl. ........................... 123/576; 123/3
(58) Field of Search ................ 123/3, 544, 576

(56) References Cited

U.S. PATENT DOCUMENTS

| | | | | |
|---|---|---|---|---|
| 3,688,755 A | * | 9/1972 | Grayson et al. | ............ 123/575 |
| 3,788,283 A | * | 1/1974 | Perry | .............................. 123/3 |
| 3,807,377 A | * | 4/1974 | Hirschler, Jr. et al. | ....... 123/575 |
| 5,357,908 A | * | 10/1994 | Sung et al. | ..................... 123/3 |
| 6,227,151 B1 | * | 5/2001 | Ma | ................................. 123/3 |

* cited by examiner

Primary Examiner—Noah P. Kamen
(74) Attorney, Agent, or Firm—Ronald E. Greigg

(57) ABSTRACT

A method and an apparatus for forming a fuel-air mixture for an internal combustion engine during a cold-starting and warmup phase. During the normal operation of the engine, fuel is evaporated by means of an evaporation and condensation system in order to recover low-boiling fuel components from the fuel delivered to first fuel delivery means during normal operation. The low-boiling fuel components condense and are collected as cold-starting fuel in a supply container. The engine, during the cold-starting and warmup phase, is supplied with cold-starting fuel from the supply container by means of second fuel delivery means, in order to reduce the concentration of hydrocarbons in the exhaust gas during the cold-starting and warmup phase.

20 Claims, 2 Drawing Sheets

METHOD AND APPARATUS FOR FORMING A FUEL-AIR MIXTURE FOR AN INTERNAL COMBUSTION ENGINE DURING A WARMUP PHASE

FIELD OF THE INVENTION

The present invention relates to a method and an apparatus for performing a fuel-air mixture for an internal combustion engine during a warmup phase.

BACKGROUND OF THE INVENTION

To meet exhaust gas regulations for Otto engines, the operating states during the uncombusted hydrocarbons in the exhaust gas are due to so-called wall film effects, that is, to the deposition of fuel components from the fuel-air mixture on the cold engine walls in the intake tube and/or in the combustion chamber.

From German Patent Disclosure DE 195 22 075 A1, a method and an apparatus for forming a fuel-air mixture are already known in which during the cold-starting and warmup phase, fuel from a fuel tank is delivered to an evaporator, which functions in a relatively low temperature range from 60° C. to 80° C., since only relatively highly volatile components of the fuel (butanes, pentanes, hexanes) are intended to be used to form the fuel-air mixture. The fuel vapor created in the fuel evaporator is delivered via an adjusting device to an intake tube, downstream in the intake direction of a throttle valve, in order to obtain a fuel-air mixture in the intake tube.

Although with this known method a reduction in hydrocarbon emissions during the warmup phase can be achieved, nevertheless at the moment when fuel components come into contact with the cold aspirated air in the intake tube or as soon as they meet still-cold parts of the engine, they condense.

An internal combustion engine known from German Patent Disclosure DE 196 33 259 A1 has an evaporator, for fuel supply during the cold-starting and warmup phase, from which the fuel vapor is carried into a mixing chamber in which the fuel vapor is made turbulent with aspirated air to form a fuel-air mixture. The fuel-air mixture is delivered to an inlet region of the individual combustion chambers of the engine via a fuel separator, for separating individual relatively large droplets from the fuel-air mixture, which also includes high-boiling fuel components.

Once again, fuel condensation during cold starting and the warmup phase can only be reduced but not averted entirely, since despite the fuel separator, not all the high-boiling components can be removed from the fuel-air mixture.

From U.S. Pat. No. 4,323,046, an internal combustion engine is known that can be operated selectively with conventional fuels produced from petroleum or nonpetroleum fuels, especially alcohol. To that end, two fuel delivery systems are associated with the known internal combustion engine, and a switchover is made between them as needed.

The nonpetroleum fuel delivery system has an evaporator tank equipped with a heater, and from this tank a fuel-air mixture flows, regulated by a suitable gas pedal, directly into the intake elbow of the engine. For the cold-starting phase, the evaporator tank for the nonpetroleum fuels is equipped with a resistance heater, which is switched off when a certain temperature is reached.

OBJECT AND SUMMARY OF THE INVENTION

The method according to the invention can be performed especially advantageously with a fuel delivery apparatus which has the advantage over the prior art that the cold-starting fuel used during the warmup phase comprises only low-boiling fuel components, and thus wall film effects in the intake tube and in the combustion chamber are virtually completely precluded, and hence the hydrocarbon emissions can be reduced sharply.

Since the low-boiling fuel components are recovered during the normal operation of the internal combustion engine, it is possible to perform a plurality of evaporation and condensation steps in succession, so that the low-boiling fuel components can be reliably separated out and enriched.

In the recovery of the cold-starting fuel during the normal operation of the engine, the engine running at its operating temperature can be used as a heat source for evaporating the low-boiling fuel components, and thus no additional heater is necessary.

In an advantageous feature of the invention, it is provided that to recover the low-boiling fuel components, the fuel that is to be delivered to the engine during normal operation is carried in liquid form through a first evaporation region of an evaporation and condensation system, and the fuel delivered to the evaporation and condensation system is preheated, while the fuel leaving the evaporation and condensation system in liquid form is cooled before being delivered to the engine.

In order to remove high-boiling fuel components from the cold-starting fuel to be recovered, the fuel evaporated in a first evaporation region of an evaporation and condensation system is subjected, beginning at a temperature of evaporation of approximately 60° C. to 160° C. in the first evaporation region, to a plurality of successive evaporation and condensation steps, until the temperature of evaporation in the region of a supply container serving to collect the cold-starting fuel has decreased to approximately 20° C. to 40° C.

In this way it becomes possible to create a cold-starting fuel which after an evaporation or atomization during the cold-starting and warmup phase, that is, while the engine is cold, condenses neither upon contact with the cold aspirated air nor upon striking cool engine walls.

In the fuel delivery from the separate supply container during the cold-starting and warmup phase, that is, in operation with the comparatively lower- boiling cold-starting fuel, additional provisions for fuel preparation and evaporation can effectively be employed.

In particular, it is possible that during the cold-starting and warmup phase, cold-starting fuel from the supply container is injected into an air intake line. If the injection takes place into an intake manifold, then along with the evaporation and condensation system and a heat exchanger, a single additional injection valve suffices for engine operation after the start.

Both in fuel injection and when fuel vapor is delivered, however, it can also be provided that during the cold-starting and warmup phase, the cold-starting fuel is introduced into the inlet region of each combustion chamber and metered individually for each combustion chamber.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
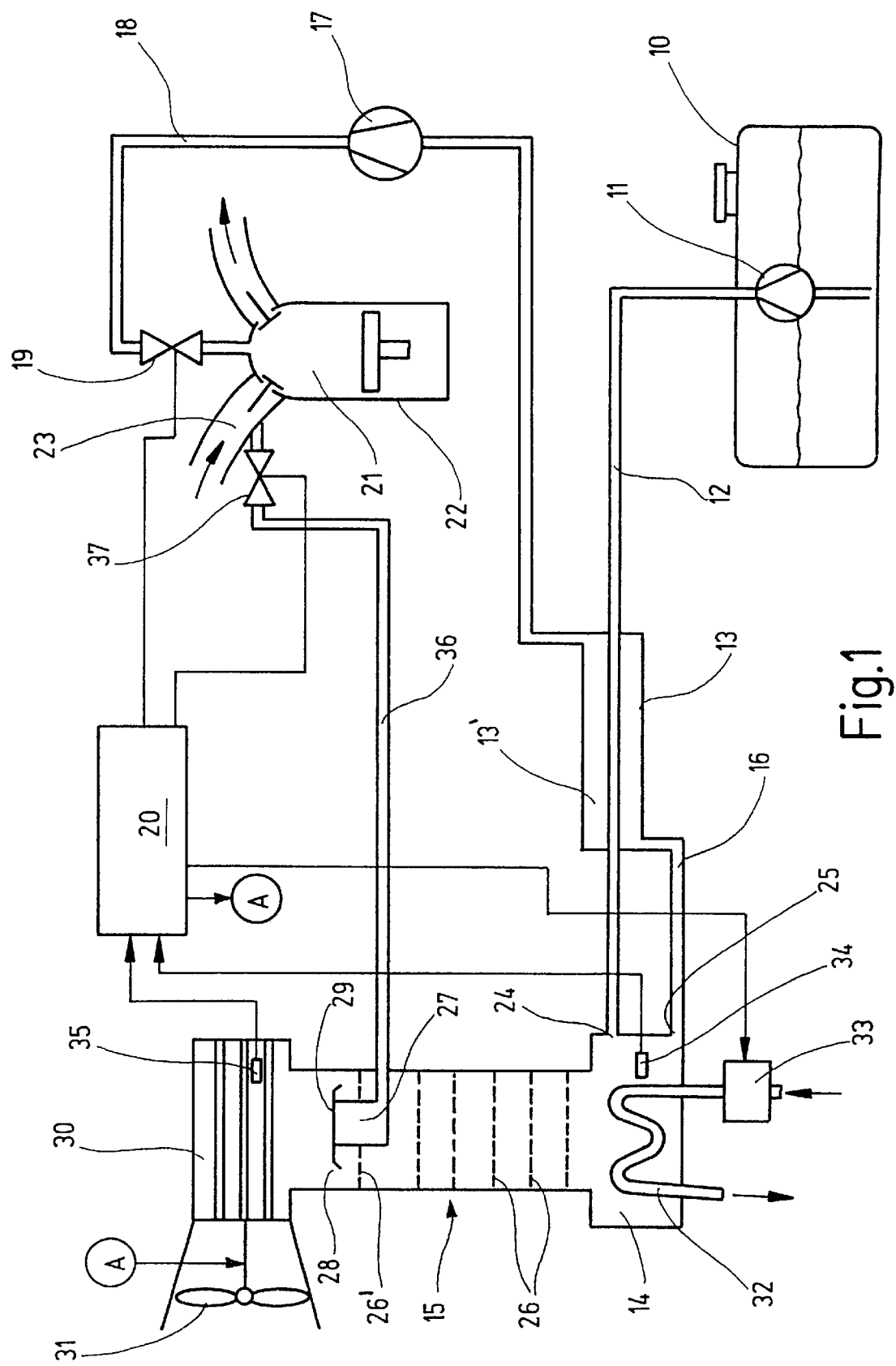
FIG. 1 schematically shows a fuel delivery apparatus in a first exemplary embodiment of the invention.

In the various drawing figures, component parts corresponding to one another are identified by the same reference numerals.

As FIG. 1 shows, a fuel delivery apparatus for an internal combustion engine according to the invention, which is intended in particular for performing the method of the invention for forming a fuel-air mixture for the engine during a cold-starting and warmup phase, includes a fuel tank 10, from which with the aid of a fuel feed pump 11, which generates a feed pressure of approximately 3 to 4 bar, fuel can be delivered through a fuel line 12 via a heat exchanger 13 to a first evaporation region 14 of an evaporation and condensation system 15. From the first evaporation region 14 of the evaporation and condensation system 15, unevaporated fuel can then be delivered via a fuel line 16 and the heat exchanger 13 to a high-pressure pump 17, whose high pressure side communicates via a fuel pressure line 18 with injection valves 19, of which only one is shown as a direct-injection valve, so that with the aid of the injection valves 19 controlled by an engine control unit 20, fuel can be injected into the individual combustion chambers 21 of the engine 22, which is shown only schematically.

As an alternative, however, it is also possible for the fuel injection to be done with the aid of the injection valves 19 individually for each combustion chamber, into the individual inlet regions 23 of the individual combustion chambers 21. Fuel injection into a common intake manifold is also conceivable.

The heat exchanger 13, by way of which preheated fuel is delivered to a fuel inlet 24 of the first evaporation region 14 of the evaporation and condensation system 15, and which via a fuel outlet 25 of the first evaporation region 14 receives heated fuel as a heating medium for the fuel to be preheated, operates by the countercurrent method. The fuel to be heated, delivered from the fuel tank 10 via the fuel line 12, accordingly acts as a coolant for the fuel delivered from the first evaporation region 14 via the fuel outlet 25 and the fuel line 16, and this fuel in turn acts as a heating means for the fuel to be heated.

By the inventive combination of a heat exchanger 13, which is preferably a countercurrent heat exchanger, with a first evaporation region 14 of an evaporation and condensation system 15, it is attained that both the fuel feed pump 11 and the first fuel delivery means, formed by the high-pressure pump 17 and the injection valves 19, can function in the usual way during normal operation of the engine, while at the same time low-boiling fuel components can be removed from the fuel delivered from the first fuel delivery means, without impeding normal operation.

The evaporation and condensation system is preferably formed by a multistage distillation system, such as a rectification column 15. In principle, all types of multistage distillation systems and rectification columns can be employed. For example, it is possible to use a packed column as the evaporation and condensation system 15. In the present exemplary embodiment, a strainer insert column with individual strainer inserts 26, 26' is shown as the rectification column 15. A supply container 27 for cold-starting fuel is disposed in the uppermost or coolest strainer insert 26' and can be made to communicate with the fuel collection region 28 of the uppermost strainer insert 26 via a valve assembly 29.

For cooling the upper end or head of the rectification column 15, the head of the column is embodied as a heat exchanger 30, to which cooling air can be supplied by means of a controllable ventilator 31.

The first evaporation region 14, or sump, of the rectification column 15 is heated with the aid of warm coolant from the coolant system of the engine 22. To control the coolant flow through a heating line 32 disposed in the first evaporation region 14, an adjusting valve 33 is provided, which is controlled by a corresponding open- and closed-loop control device, which may for instance be integrated with the engine control unit 20.

To monitor the operation of the rectification column 15 and to control the heating of the first evaporation region 14 and the cooling of the head of the rectification column 15, temperature sensors 34 and 35 are provided in the first evaporation region 14 and in the heat exchanger 30 intended for cooling, or in the region of the uppermost or coolest strainer insert 26'; their output signals are carried to the open- and closed-loop control device, which is assumed, for purposes of explaining the invention in terms of the exemplary embodiment, to be integrated with the engine control unit 20.

The closed- and open-loop control device, which however, unlike what is described here, can also be provided as a separate circuit, controls the inflow of hot water to the heating line 32 in the sump or first evaporation region 14 of the rectification column via the adjusting valve 33, and the delivery of cooling air to the heat exchanger 30 by means of the ventilator 31, as a function of the output signals of the respective temperature sensors 34 and 35, in such a way that a temperature of 60° C. to 160° C. is established in the first evaporation region 14, while the head of the rectification column 15, and thus essentially the fuel collection region 28 of the uppermost or coolest strainer insert 26' as well, is kept at a temperature in the range from 20° C. to 40° C.

Figure 2:
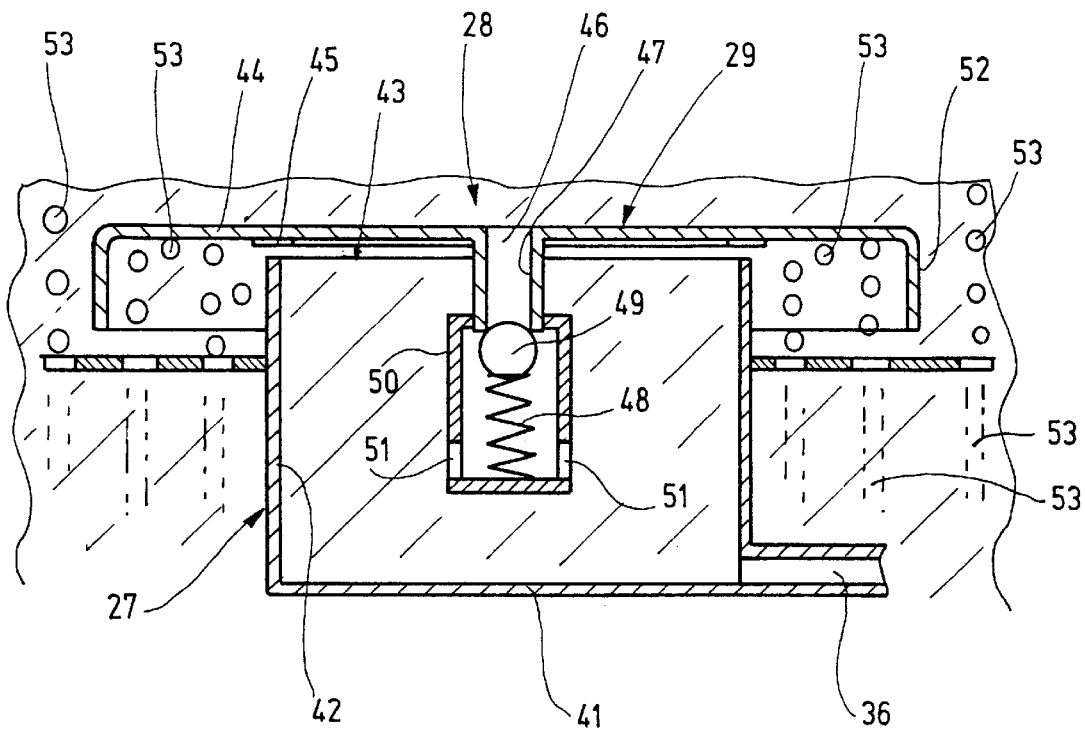
FIG. 2 schematically shows a supply container for collecting cold-starting fuel.

In the fuel collection region 28 of the uppermost or coolest strainer insert 26', only low-boiling fuel components accumulate, which as described below in conjunction with FIG. 2 are caught and stored in the supply container 27, in order during a cold-starting and warmup phase to enable injection into an intake tube or individually for each combustion chamber into the individual inlet regions 23 of the respective combustion chambers 21, via a fuel line 36 and an injection valve 37.

Figure 3:
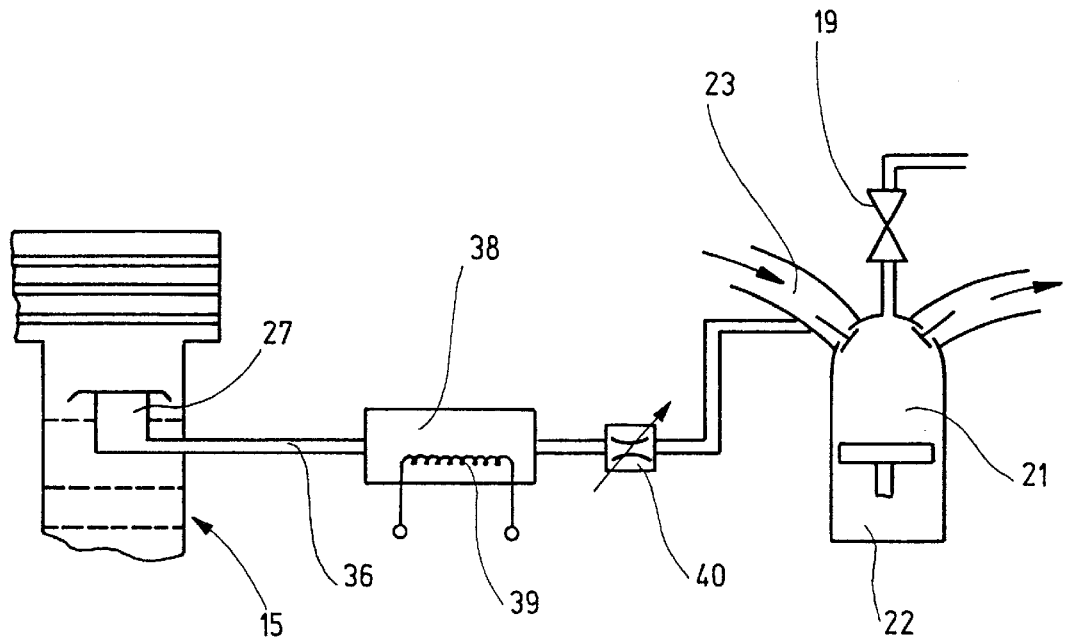
FIG. 3 shows fuel delivery means for delivering cold-starting fuel from the supply container during the cold-starting and warmup phase, according to a second exemplary embodiment of the invention.

Instead of injecting cold-starting fuel, it is also possible, as suggested in FIG. 3, to integrate an evaporator 38 with the fuel line 36; the evaporator can be heated with a heater 39, in order to produce fuel vapor from the cold-starting fuel from the supply container 27, which vapor is delivered via a metering device 40 to an intake manifold, or as shown individually to each combustion chamber to the individual inlet regions 23 of the respective combustion chambers 21.

The supply container 27 shown in FIG. 2 has a bottom wall 41 and a circumferential wall 42, on the upper edge 43 of which a valve cap 44 rests by its own weight, either directly or preferably via a sealing ring 45, as long as the rectification column 15 is not in operation. The valve cap 44 has a central opening 46, which is adjoined by a valve connector stub 47, which together with a valve body 49, braced on a spring 48 and preferably embodied as a ball, forms a check valve. The spring 48 that presses the valve body 49 against the valve connector stub 47 is disposed in a supporting housing 50, which is secured in the supply container 27 in a manner not shown in detail, and whose interior communicates via openings 51 with the interior of the supply container 27.

On its outer circumference, the valve cap 44 has a circumferential wall 52, forming a trapping chamber for rising fuel bubbles 53.

The operation of the fuel delivery apparatus according to the invention will now be described.

In normal operation of the engine 22, or in other words after the end of the warmup phase, fuel is pumped by the fuel feed pump 11 via the fuel line 12 to the heat exchanger 13, the first evaporation region 14 of the rectification column 15, the line 16, and the counterflow region 13' of the heat exchanger 13 to the high-pressure pump 17. The high-pressure pump 17 furnishes fuel, which is at a pressure of approximately 120 bar, via the fuel pressure line 18 to the direct-injection valves 19, which are controlled by the engine control unit 20 in accordance with the engine power required at the time.

The fuel pumped out of the fuel tank 10 to the first fuel delivery means, which reaches the sump or first evaporation region 14 of the rectification column 15 in preheated form, is further heated there, by the warm coolant of the engine cooling system flowing through the heating line 32, and evaporated. Since there is a temperature gradient from bottom to top in the rectification column such that the temperature drops from the range of about 60° C. to 160° C. to the range of about 20° C. to 40° C., the fuel vapor and recondensed liquid fuel flow in countercurrent through a plurality of evaporation and condensation steps, so that the low-boiling fuel components are separated from the high-boiling fuel components and reach the fuel collection region 28 of the uppermost or coolest strainer insert 26'.

As a result of the rising fuel bubbles 23, the valve cap 44 of the valve assembly 29 is lifted from the upper edge 43 of the circumferential wall 42 of the supply container 27, so that through the slit formed between the upper edge 43 and the sealing ring 45, fuel can flow into the interior of the collecting container. The collecting container 27 thus fills with the low-boiling fuel components, during normal operation of the engine 22.

When the engine 22 is switched off, the fuel feed pump 11 and the high-pressure pump 17 are switched off as well, and the operation of the rectification column 15 is ended. The fuel located in the rectification column 15 condenses and then collects in its lower region. Because there is now no longer any buoyancy, the valve cap 44 sinks and closes the supply container 27, so that the low-boiling fuel components collected in the supply container 27 are available as cold-starting fuel for the next time the engine is started.

As soon as the engine is started, the fuel feed pump 11 is switched on and puts the entire fuel delivery apparatus at an operating pressure of about 3 to 4 bar. At this time, the high-pressure pump may still be switched off, and the direct-injection valves 19 are closed.

The system pressure of 3 to 4 bar generated by the fuel feed pump 11 is propagated through the rectification column 15 and opens the check valve 47, 49, so that the interior of the supply container 27 is likewise at the operating pressure. With the aid of the system or operating pressure of the fuel feed pump 11, cold-starting fuel is now pumped out of the supply container 27 through the fuel line 36 to the injection valve 37, which is actuated by the engine control unit 20.

The injection of cold-starting fuel can be accomplished with the aid of a single injection valve into an intake collection chamber. However, it is also possible for each inlet region 23 of the combustion chambers 21 to be assigned its own injection valve 37, so that the fuel metering can be done individually for each combustion chamber via the injection valves 37.

If instead of the injection valves 37 an evaporator 38 is used, as shown in FIG. 3, then the cold-starting fuel vapor created in the evaporator 38, which comprises only low-boiling fuel components, can be introduced into the intake collection chamber via a single adjusting device 40. In this case as well, however, it is possible with the aid of a suitable number of adjusting devices 40 to supply fuel vapor to the individual inlet regions 23 of the combustion chambers 21 individually for each combustion chamber.

As soon as the engine has reached an adequate operating temperature, the high-pressure pump 17 and the direct-injection valves 19 are put into operation by the control unit 20, while the delivery of cold-starting fuel is terminated.

However, in the direct injection of fuel as described, it is also possible for fuel in homogeneous operation to be delivered with this method not only during starting and warmup of the engine but also at full load. As a result, for the critical operating states in terms of the range of variation of the high-pressure injection valves, that is, direct-injection valves, fuel can be injected even at high charge pressures in turbocharged engines as well.

The method according to the invention makes it possible to deliver cold-starting fuel during a cold-starting and warmup phase while making do without additional pumps, and in the simplest case using only a single additional injection valve. However, such additional provisions for fuel preparation as individual injection and evaporation can also be effectively employed in operation using the more highly volatile mixture component of the fuel, or in other words in operation using cold-starting fuel.

The foregoing relates to preferred exemplary embodiments of the invention, it being understood that other variants and embodiments thereof are possible within the spirit and scope of the invention, the latter being defined by the appended claims.

I claim:

1. A method for forming a fuel-air mixture for an internal combustion engine (22) during a warmup phase, which comprises evaporating the fuel during normal operation of the engine (22) in order to recover low-boiling fuel components from the fuel used during the normal operation by directing the fuel in liquid form through a first evaporation region (14) of an evaporation and condensation system (15);

preheating the fuel delivered to the evaporation and condensation system (15);

condensing and collecting the low-boiling fuel components as cold-starting fuel in a supply container (27); and preparing cold-starting fuel from the supply container (27) during the warmup phase to form a fuel-air mixture, and cooling the fuel leaving the evaporation and condensation system (15) in liquid form before being delivered to the engine (22).

2. The method according to claim 1, which comprises preheating and cooling of the fuel carried to the evaporation and condensation system (15) which operates by a countercurrent method.

3. The method according to claim 1, which comprises decreasing the temperature of evaporation in the evaporation and condensation system (15) from approximately 60° C. to 160° C. in the first evaporation region (14) to approximately 20° C. to 40° C. in the region of the supply container (27).

4. The method according to claim 1, which comprises heating the first evaporation region (14) by warm coolant from an engine coolant system, while cooling the low-temperature range of the evaporation and condensation system (15) by means of an air-cooled heat exchanger (30).

5. The method according to claim 1, which comprises injecting cold-starting fuel from the supply container (27) into an air intake line during the warmup phase.

6. The method according to claim 1, which comprises evaporating cold-starting fuel from the supply container (27) and then delivering the evaporated fuel to the engine (22) during the warmup phase.

7. The method according to claim 1, which comprises introducing the cold-starting fuel into the inlet region (23) of each combustion chamber (21) and metering the fuel individually for each combustion chamber during the warmup phase.

8. A fuel delivery apparatus for an internal combustion engine (22), comprising
    first fuel delivery means (17, 19) for delivering fuel to the engine (22) after an end of a warmup phase;
    a distillation system, including a rectification column (15) having a plurality of strainer inserts (26, 26') used as an evaporation and condensation system (15) for fuel for recovering low-boiling fuel components as cold-starting fuel from the fuel used during a normal operation;
    a supply container (27) for the cold-starting fuel is made to communicate with a fuel collection region (28) of an uppermost and coolest strainer insert (26); and
    second fuel delivery means (37; 38, 40) for delivering cold-starting fuel from the supply container (27) to the engine (22) during the warmup phase.

9. The fuel delivery apparatus according to claim 8, in which the supply container (27) for the cold-starting fuel is made to communicate with the fuel collection region (28) of the uppermost and coolest strainer insert (26') via a valve assembly (29).

10. The fuel delivery apparatus according to claim 9, in which the valve assembly (29) has an inflow valve (43, 45), through which cold-starting fuel flows into the supply container (27) during the operation of the rectification column (15), and includes a check valve (47, 49), through which the cold-starting fuel is under pressure during the cold-starting and warmup phase.

11. The fuel delivery apparatus according to claim 8, in which the second fuel delivery means include injection valves (37) for injecting a fuel mist, each into one inlet region (23) of a combustion chamber (21) of a the engine (22).

12. The fuel delivery apparatus according to claim 11, in which the second fuel delivery means have adjusting devices (40, 37) for fuel metering, which each communicate on an outlet side with a respective inlet region (23) of the combustion chambers, so that the cold-starting fuel is metered individually for each combustion chamber.

13. The fuel delivery apparatus according to claim 8, in which the second fuel delivery means include at least one evaporator (38) for creating fuel vapor from the cold-starting fuel, as well as fuel vapor metering means, for delivering fuel vapor to an intake tube region of the engine (22).

14. A method for forming a fuel-air mixture for an internal combustion engine (22) during a warmup phase, which comprises
    evaporating the fuel during normal operation of the engine (22) in order to recover low-boiling fuel components from the fuel used during the normal operation by directing the fuel in liquid form through a first evaporation region (14) of an evaporation and condensation system (15);
    subjecting the fuel evaporated in the first evaporation region (14) of the evaporation and condensation system (15) to a plurality of successive evaporation and condensation systems, in order to remove high-boiling fuel components from the cold-starting fuel to be recovered;
    condensing and collecting the low-boiling fuel components as cold-starting fuel in a supply container (27); and
    preparing cold-starting fuel from the supply container (27) during the warmup phase to form a fuel-air mixture; and delivering the prepared fuel to the engine (22).

15. A fuel delivery apparatus for an internal combustion engine (22), comprising
    first fuel delivery means (17, 19) for delivering fuel to the engine (22) after an end of a warmup phase;
    an evaporation and condensation system (15) for fuel for recovering low-boiling fuel components as cold- starting fuel from the fuel used during a normal operation;
    the evaporation and condensation system (15) has a fuel inlet (24), which communicates via a heat exchanger (43) with a fuel tank (10) in which the fuel is cooled, so that preheated fuel is delivered to a first evaporation region (14), and has a fuel outlet (25), which communicates via the heat exchanger (13) with the first fuel delivery means (17, 19);
    a supply container (27) for the cold-starting fuel; and
    second fuel delivery means (37; 38, 40) for delivering cold-starting fuel from the supply container (27) to the engine (22) during the warmup phase.

16. The fuel delivery apparatus according to claim 15, in which the heat exchanger (13) is a countercurrent heat exchanger.

17. The fuel delivery apparatus according to claim 15, in which a heating means (32), to which warm coolant from an engine coolant system is delivered, is disposed in the first evaporation region (14) of the evaporation and condensation system (15).

18. The fuel delivery apparatus according to claim 15, in which an air-cooled heat exchanger (30) is connected with the fuel collection region (28) for cold-starting fuel.

19. The fuel delivery apparatus according to claim 15, in which one temperature sensor (34, 35) each is disposed in the first evaporation region (14) and in the fuel collection region (28) for cold-starting fuel or in the air-cooled heat exchanger (30), and output signals are delivered to a monitoring and control device that monitors and controls the operation of the evaporation and condensation system (15).

20. The fuel delivery apparatus according to claim 19, in which the monitoring and control device for operating the evaporation and condensation system (15) is integrated with an engine control unit (20).

* * * * *